W. R. GARNER.
NUT LOCK.
APPLICATION FILED MAR. 16, 1909.
930,173.
Patented Aug. 3, 1909.
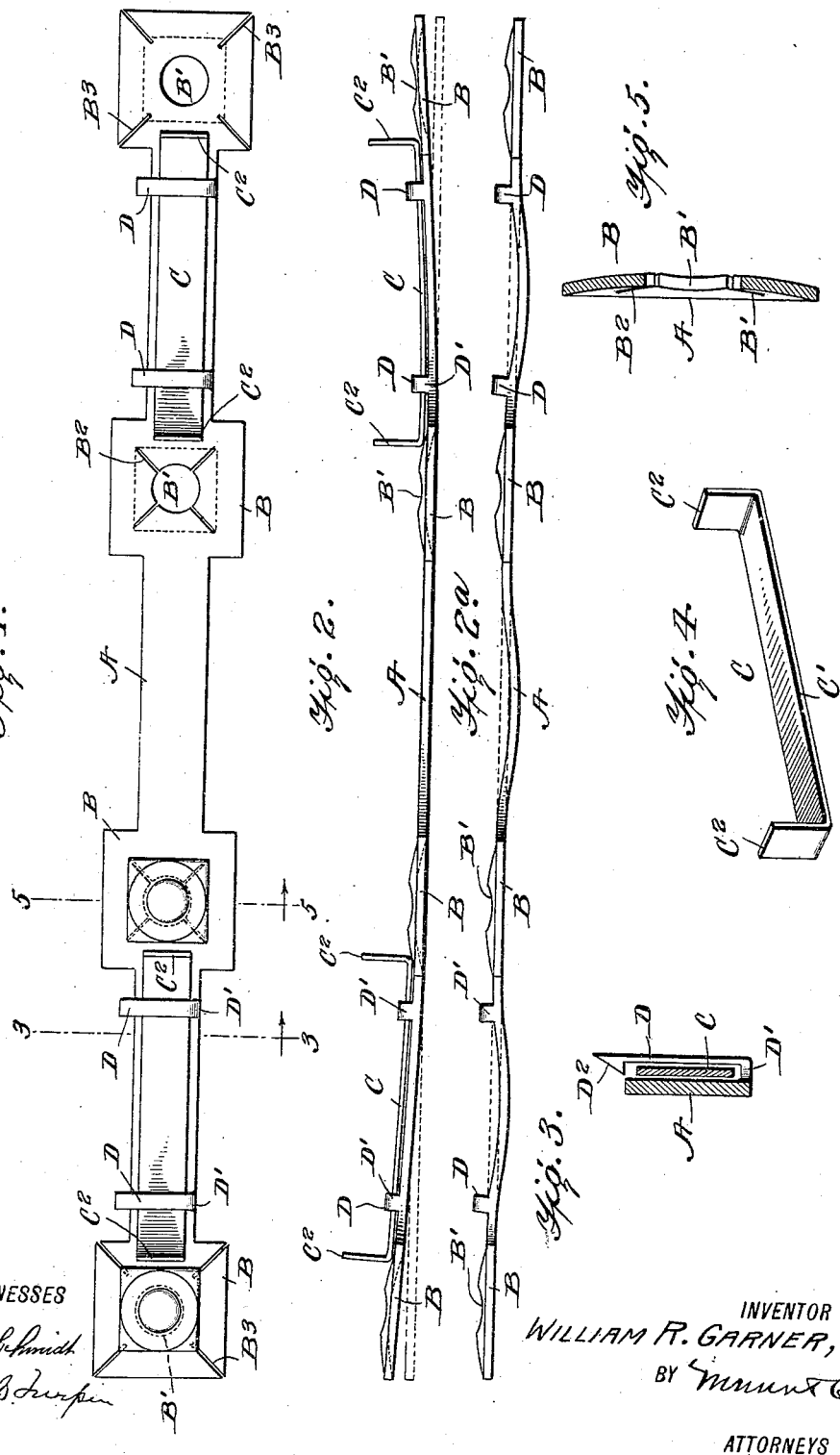
WITNESSES
INVENTOR
WILLIAM R. GARNER,
BY
ATTORNEYS

UNITED STATES PATENT OFFICE.

WILLIAM R. GARNER, OF PALESTINE, TEXAS.

NUT-LOCK.

No. 930,173.     Specification of Letters Patent.     Patented Aug. 3, 1909.

Application filed March 16, 1909. Serial No. 483,690.

*To all whom it may concern:*

Be it known that I, WILLIAM R. GARNER, a citizen of the United States, and a resident of Palestine, in the county of Anderson and State of Texas, have made certain new and useful Improvements in Nut-Locks, of which the following is a specification.

This invention is an improvement in nut locks and particularly in nut locks especially designed for use on railway rail joints and railroad frogs; and the invention consists in certain novel constructions and combinations of parts as will be hereinafter described and claimed.

In the drawings Figure 1 is a front elevation of a nut lock embodying my invention. Fig. 2 is a bottom plan view thereof. Fig. 2ª is an edge view of the body plate in its normal position. Fig. 3 is a detail cross section on about line 3—3 of Fig. 1, some of the parts in the rear being omitted. Fig. 4 is a detail perspective view of one of the locking plates, and Fig. 5 is a cross section on about line 5—5 of Fig. 1.

In carrying out my invention I provide a body plate A, which is provided at intervals with portions forming spring washers B. These spring washers have a superficial area sufficient to form a base for the nut when turned home, and are slitted radially and dished from the inner side forming a convex outwardly projecting or bulging seat for the base of the nut. As shown in Fig. 1, the body plate has four washer portions, but I may desire to use two or more combination washer portions, and spring wings at option, and I have shown these washer portions as slitted radially in one instance from the central opening B' for the bolt as shown at B² in the intermediate washers, or they may be slitted from the outer edge as shown at B³ in the outer or end washer see Fig. 1. In both instances I utilize the resilience of the metal and do this by producing an outwardly arched or bulging spring portion forming a cushioning seat for the nut. I also prefer to make the body plate A of spring metal and to deflect it outwardly at its ends as best shown in Fig. 2, to cause the said ends to coöperate with the end cushioning washers, but I prefer to use spring arms between each bolt hole as shown by Fig. 2ª of the drawing, in affording a resilient seat for the nuts when the latter are turned home. The slitting of the washer portions is also advantageous in that thereby they act as a nut lock through the medium of the edges and corners of the portions separated by the slits B² and B³, but I prefer to employ in connection with the cushioning washers the locking plate C, shown in detail in Fig. 4, and applied in Figs. 1 and 2, and comprising a main plate C', and upturned end plates C² which latter bear along side adjacent nuts as shown in Fig. 1 of the drawings. These locking plates C are held to the body plate A by holders D in the form of clips secured at one end D' to the body A, being preferably integral with the said plate as shown in Fig. 3, and extending up parallel with the planes of said plate A, but slightly separated therefrom and having at their free ends shoulders D² springing over the main plates C' of the holders when the latter are applied and securing the said holders firmly in position with their end plates C² along side the nuts. By springing the hooked ends D² of the clips D back the holders may be readily removed.

By the construction of spring washers and spring arms extending between the bolts and along the sides of the plates or angle bars of railroad joints, and railroad frogs, the nuts when screwed tightly home, and the holders inserted, the nuts will not only be prevented from turning, but the plates and angle bars will be held tightly in position on the rail joints to prevent the rails from moving in any direction or spreading, and also to prevent the rails from going down or dropping in a soft road bed, and the nuts will be prevented from rattling or turning back over the bolts and all lost motion of the nuts and angle bars will be followed up by the spring washers and spring arms when operating as before described.

It will be noticed in Fig. 1 that I have shown the nuts applied to one of the end washer portions and to one of the intermediate washer portions and omitted them from the other washer portions.

I claim—

1. The nut lock herein described comprising a body plate provided at intervals with washer portions forming a base bearing for nuts and having bolt holes and radial slits, and having their central portions bulged or convexed outwardly forming spring washers for the nuts, the body plate being deflected to operate as springs, clips secured at one edge to the body plate and extending thence along side the plate and shouldered adjacent to their free ends, and locking plates having main plates held by their respective clips, and end plates or wings to lap along side the nuts to be locked, substantially as set forth.

2. A nut lock comprising a body plate having spring washer portions for engagement by nuts, clips secured at one end to the said body plate and free at their other ends, and having their said other ends shouldered, and a locking plate held by the said clips, and having means for locking the nuts, substantially as set forth.

3. In a nut lock, a body plate having bolt holes and having its arms between said bolt holes deflected whereby the arms will operate with an outward tension beneath nuts seated thereagainst, and separate nut locking devices carried by the body plate, substantially as set forth.

4. In a nut lock a body plate having bolt holes, and having its arms between the bolt holes deflected whereby the arms will act with a spring action beneath nuts seated thereagainst, a nut locking plate operated between adjacent nuts, and devices on the body plate for holding said nut locking plate, substantially as set forth.

5. A nut lock comprising a body plate provided at intervals with bolt holes, and having between said bolt holes clips secured at their lower edges to the body plate, and extending thence upwardly alongside the plate and spaced therefrom and shouldered adjacent to their free ends, and locking plates having main plates held by their respective clips, and end plates or wings to lap alongside the nuts to be locked.

WILLIAM R. GARNER.

Witnesses:
J. E. MILLER,
M. J. HICKEY.